(No Model.)
W. D. WATKINS.
CULTIVATOR.
No. 420,551. Patented Feb. 4, 1890.
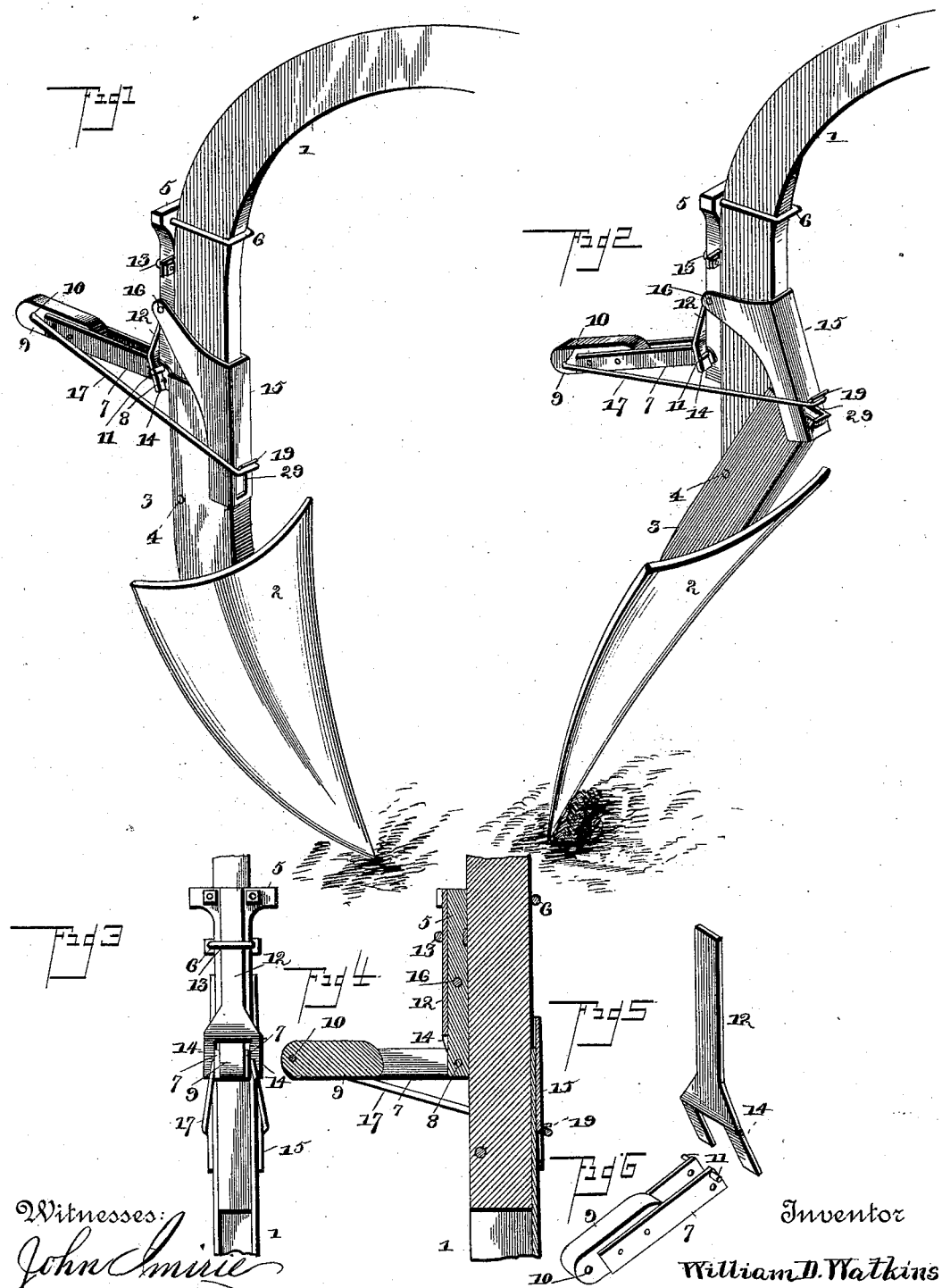
Witnesses:
John Imirie
Inventor
William D. Watkins
By his Attorneys
C.A. Snow & Co

UNITED STATES PATENT OFFICE.

WILLIAM D. WATKINS, OF OSCEOLA, MISSOURI, ASSIGNOR OF ONE-HALF TO JOHN H. LUCAS, OF SAME PLACE.

CULTIVATOR.

SPECIFICATION forming part of Letters Patent No. 420,551, dated February 4, 1890.

Application filed October 26, 1889. Serial No. 328,219. (No model.)

*To all whom it may concern:*

Be it known that I, WILLIAM D. WATKINS, a citizen of the United States, residing at Osceola, in the county of St. Clair and State of Missouri, have invented a new and useful Cultivator, of which the following is a specification.

This invention has relation to cultivators, and has particular reference to the means for attaching the cultivator to its standard, the object being to construct the attachment so as to permit a ready yielding of the shovel should the same come in contact with stones, stumps, or other obstacles calculated to injure or break it.

A further object of the invention is to accomplish the above in a simple, cheap, and efficient manner, and to arrange the parts so as to protect each other from accumulations of dirt, &c., calculated to impair the efficiency of their operation.

With these general objects in view the invention consists in a cultivator having a shank U-shaped in cross-section and embracing and pivoted below its upper end to the standard, a U-shaped cap pivoted at its upper end to said standard and having its lower end depending over and upon the shank of the shovel and serving to maintain the same normally in alignment therewith, a rearwardly-projecting pivoted arm maintained in position by a spring, and a link connecting the outer end of the arm with the lower end of the cap and maintaining the cap snugly upon the shank of the shovel or cultivator by the tension of the spring, and in certain other features of construction hereinafter specified, and particularly pointed out in the claims.

Referring to the drawings, Figure 1 is a perspective of a cultivator-standard provided with a shovel connected thereto in accordance with my invention. Fig. 2 is a similar view, but showing the tooth tilted as in the act of striking a stone. Fig. 3 is a rear elevation. Fig. 4 is a vertical section. Fig. 5 is a perspective in detail of the spring. Fig. 6 is a detail view of the horizontal spring-pressed arm.

Like numerals of reference indicate like parts in all the figures of the drawings.

1 represents a cultivator-standard, and 2 the cultivator or shovel, the upper end of which merges into a U-shaped shank 3, said shank being of such relative size as loosely to embrace the front edge of the standard and pivoted to the standard near its rear lower end and near the rear edge of the shank, as at 4.

5 represents a plate which by clips 6 is secured in position above the lower end and upon the rear edge of the standard 1. The lower end of the plate reaches slightly below the upper edge of the shank, and from the same there project opposite straps 7, said straps being pivoted, as at 8, to said plate and having an arm 9 securely bolted between them, said arm having a perforation 10 at its extremity.

11 represents opposite lugs, which project laterally from the upper inner corners of the straps, and 12 represents a flat spring-plate the shank of which is embraced by a clip 13 and held in position upon the plate 5. The lower end of the spring-plate is bifurcated, forming a pair of spring-arms 14, the extremities of which rest upon the laterally-projecting lugs, pressing them inwardly and serving to maintain the outwardly and rearwardly projecting arms in a substantially-horizontal position.

15 represents a cap of U shape in cross-section and of a size adapted to inclose the U-shaped shank of the shovel somewhat snugly. The upper ends of the cap are extended to the rear and pivotally connected, as at 16, to the clip-plate 5 above the shank of the cultivator, the lower front end of the cap extending down and over the front edge of the cultivator and standard.

17 represents a link the rear end of which is loosely mounted in the perforation formed in the rear extremity of the spring-pressed horizontal arm, the opposite end of said link embracing the cap and maintained in position thereupon by a stop 19. The length of the link is such that when the cap and shank of the cultivator are in alignment, as when the plow is passing through soft earth and the rearwardly-extending arm is inwardly pressed to its limit, the same snugly embraces the cap and draws the same closely upon the shank of the cultivator. Now if obstructions are met with sufficient to injure the cultivator or shovel, the same swings rearwardly at its lower end, forcing the cap forwardly at its lower end, the spring-pressed arm swinging downward against the tension of the spring, and after the obstruction has been passed the spring returns the parts to their normal positions.

The stop 19 is formed by cutting an opening 29 in the cap and bending the metal upward. When the shank 3 tilts forward, its upper end engages the opening 29, and thus limits the tilting of the shovel, as shown in Fig. 2.

In place of a spring-plate a coiled spring may be employed.

Having thus described my invention, what I claim is—

1. The combination, with the cultivator-standard, of the shovel having a U-shaped shank pivoted to the lower end of the said standard, and below the upper end of said shank a U-shaped cap pivoted above the shank at its rear upper end and embracing and extending down over the front end of the shank, a rearwardly-extending pivoted arm provided with lateral lugs above its pivot, a link connecting the arm with the cap below its pivot, and a bifurcated spring-plate mounted above the arm and having its bifurcations resting on the lugs and serving to maintain the arm in a normal horizontal position, substantially as specified.

2. The combination, with the cultivator-standard, of the shovel, the upper end of which merges into a U-shaped shank embracing the standard and pivotally connected between its ends and near its rear edge to the lower rear edge of the standard, a plate clipped to the rear of the standard above the shank, a U-shaped cap embracing the standard and shank at its front edge and having its rear ends pivoted to the clip-plate, straps pivoted to the lower ends of the clip-plate and having an arm perforated at its outer end securely bolted between them, a link connecting the perforated arm with stops on the cap, laterally-projecting lugs formed on the straps above their pivot-points, and a spring-plate the shank of which is clipped to the plate and the lower end of which is bifurcated and rests upon the lugs, serving to maintain the arm in a horizontal position, substantially as specified.

3. The combination, with the cultivator-standard, of the shovel having a shank pivoted below its upper to the lower end of the same, a cap pivoted above the shank at its rear upper end and embracing and extending down over the front end of the shank and provided with an opening 29 and stop 19, a rearwardly-extending pivoted arm, a link connecting the arm with the stop of the cap below its pivot, and a spring engaging with the arm and serving to maintain the arm in a normal horizontal position, substantially as specified.

In testimony that I claim the foregoing as my own I have hereto affixed my signature in presence of two witnesses.

WILLIAM D. WATKINS.

Witnesses:
LESLIE RODGERS,
GEO. H. DANIEL.